No. 756,269. PATENTED APR. 5, 1904.
J. P. McMAHON.
NUT LOCK.
APPLICATION FILED JAN. 5, 1903.
NO MODEL.
Fig. 1.
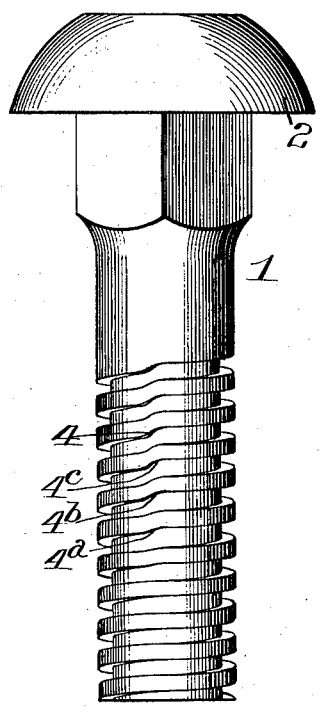
Fig. 3.
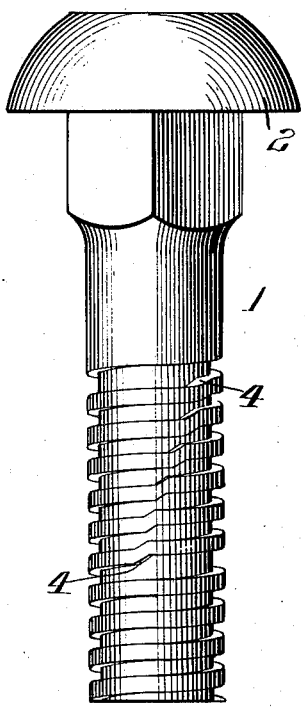
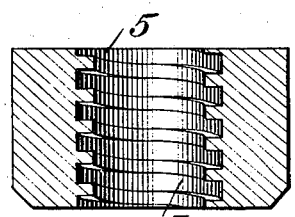
Fig. 2.
Witnesses
Walter B. Payne.
G. Willard Pick.
Inventor
Joseph P. McMahon.
by Frederick F. Church
his Attorney No. 756,269.

Patented April 5, 1904.

UNITED STATES PATENT OFFICE.

JOSEPH P. McMAHON, OF ROCHESTER, NEW YORK, ASSIGNOR OF ONE-HALF TO JOHN F. FROMM, OF ROCHESTER, NEW YORK.

NUT-LOCK.

SPECIFICATION forming part of Letters Patent No. 756,269, dated April 5, 1904.

Application filed January 5, 1903. Serial No. 137,856. (No model.)

*To all whom it may concern:*

Be it known that I, JOSEPH P. McMAHON, of Rochester, in the county of Monroe and State of New York, have invented certain new and useful Improvements in Nut-Locks; and I do hereby declare the following to be a full, clear, and exact description of the same, reference being had to the accompanying drawings, forming a part of this specification, and to the reference-numerals marked thereon.

My present invention relates to threaded bolts and the nuts coöperating therewith; and it has for its object to provide a thread upon one of said parts and a coöperating thread upon the other whereby they shall be securely locked together and prevented from jarring loose, yet which can be easily disengaged by the application of a wrench or other suitable tool or instrument.

To these and other ends the invention consists in certain improvements and combinations of parts, all as will be hereinafter more fully described, the novel features being pointed out in the claims at the end of the specification.

In the drawings, Figure 1 is a side elevation of a bolt provided with a thread formed thereon in accordance with my invention. Fig. 2 is a cross-sectional view of a nut adapted to coöperate with the bolt. Fig. 3 is a view similar to Fig. 1, showing a different method of arranging the offset portions in the thread.

Similar reference-numerals in the several figures indicate similar parts.

In illustrating my invention I have shown it applied to a bolt 1, provided with the usual or any preferred form of head 2 at one end and at its opposite extremity having the screw-thread upon which is secured the nut movable thereon relative to the head 2. Bolts provided with the usual spiral thread when subjected to vibration become loosened by having the nuts thereon move backwardly on the thread through constant jarring or the slight and imperceptible movements in the structure in which they are employed. To remedy this difficulty, I provide one of the members with a thread having offset portions therein which form shoulders adapted to strain or distort the thread upon the other member out of its original position. Said member is moved into engagement therewith, and to this end the threads upon the nut are suitably formed to permit them to move laterally without being broken by a shearing action between the parts. The particular style of thread employed is not essential to the successful operation of my invention, although I have shown one known as a "square" thread, and in forming it upon the bolt I provide it at intervals with offset portions 4, which extend at a slight angle to the general direction or lead of the thread around the bolt. These offset portions form, in effect, shoulders in the thread; but as their sides extend at an angle to the latter the threads upon the coöperating nut member will be distorted slightly out of pitch when it is forcibly moved into position. As this requires a slight lateral movement or wave motion in the thread as the nut is revolved, I form the thread 5 therein somewhat deeper than the coöperating thread upon the bolt member, so that said thread is allowed to yield and will give laterally as the shoulder or offset portion 4 passes between its adjacent convolutions. In order to securely hold the nut in adjusted position upon the bolt, I provide the offset portions 4 in adjacent convolutions of the thread. In the drawings I have shown a few of the convolutions of the thread at the outer end of the bolt formed in the usual manner without the offsets therein, which enables the nut to be started evenly, thus obviating any liability of stripping the thread upon either part, and in forming the offsets 4 I provide those in the first few succeeding convolutions graduated, as indicated at 4ª, 4ᵇ, and 4ᶜ, so that the pointed advancing end of the thread on the nut gradually takes up the curves of the offset as the nut is rotated. These graduated portions also operate to straighten the thread into its normal position when the nut is unscrewed.

In forming a bolt provided with the threads as above described it is made of such a length that when the nut is in the operative or binding position each turn of its thread will lie between those on the bolt provided with an offset, although this is not necessary to securely lock the nut.

In Fig. 3 I have shown another form of the thread, in which the offset portions 4 are arranged out of alinement, and in the present instance they extend spirally around the bolt, so that the thread in the nut will be distorted at various points, causing it to be securely locked in whatever position it may be adjusted.

While I have employed a single thread in the illustration and that a square-cut thread, the invention is equally applicable to the usual V-shaped or other varieties of thread and also whether or not the bolt is provided with one or more threads.

I claim as my invention—

1. The combination with a member provided with a continuous thread having portions offset in the direction of its lead, of a coöperating member having threads thereon deeper than those on the other member and capable of being distorted by the offset portions in the coöperating thread.

2. The combination with a member provided with a continuous thread having a plurality of offset portions, of a coöperating member having the thread of greater depth than that of the other member adapted to be distorted by one or more of said offset portions.

3. The combination with a member provided with an external thread which has plain convolutions at its extremity and above the latter is provided with a plurality of offset portions, of a nut provided with a thread of greater depth than that of the externally-threaded member and adapted to coöperate therewith and to engage the offset portions and to be distorted thereby.

4. The combination with a bolt member provided with an external thread having offset portions therein extending in the direction of its lead, of a nut adapted to engage the bolt having an internal thread cut deeper than the one on the bolt.

5. In a nut-lock the combination with a bolt having a thread which extends around it in plain convolutions at its extremity and above the latter is provided with a plurality of offset portions, said portions being graduated, of a nut having the thread adapted to engage the thread on the bolt and to be distorted thereby.

6. The combination with a bolt 1 having a thread provided with offset portions 4 therein adjacent to each other in separate convolutions being arranged out of alinement, of a nut 3 having the thread 5 therein formed deeper than the thread on the bolt.

JOSEPH P. McMAHON.

Witnesses:
G. WILLARD RICH,
ELIZABETH J. PERRY.